United States Patent [19]

Berglund

[11] Patent Number: 5,730,517
[45] Date of Patent: Mar. 24, 1998

[54] PROJECTOR

[75] Inventor: Stig Berglund, Stockholm, Sweden

[73] Assignee: Optica Nova Onab AB, Sweden

[21] Appl. No.: 704,555

[22] PCT Filed: Mar. 22, 1994

[86] PCT No.: PCT/SE94/00252

§ 371 Date: Oct. 21, 1996

§ 102(e) Date: Oct. 21, 1996

[87] PCT Pub. No.: WO94/22047

PCT Pub. Date: Sep. 29, 1994

[30] Foreign Application Priority Data

Mar. 23, 1993 [SE] Sweden ................ 9300958
Mar. 23, 1993 [SE] Sweden ................ 9300959

[51] Int. Cl.[6] ................ G03B 21/14
[52] U.S. Cl. ................ 353/70; 353/DIG. 3; 353/69
[58] Field of Search ................ 353/100, 101, 353/DIG. 3, DIG. 6, 69, 70

[56] References Cited

U.S. PATENT DOCUMENTS 4,133,605  1/1979  Wiggin ................ 353/DIG. 3
5,467,152  11/1995 Wilson et al. ................ 353/DIG. 3

FOREIGN PATENT DOCUMENTS

3443356 A1  5/1986  Germany.
3828562 C2  7/1991  Germany.
59-192236   10/1984  Japan.

OTHER PUBLICATIONS

Patent Abstracts of Japan, vol. 9, No. 54, P-340, abstract of JP, A, 59-192236 (Nippon Denki K.K.) Oct. 31, 1984.

*Primary Examiner*—William Dowling
*Attorney, Agent, or Firm*—Lerner, David, Littenberg, Krumholz & Mentlik

[57] ABSTRACT

A projector which projects a flat picture or image in a horizintal plane onto a vertical screen. Because the projection optic used is arranged above one corner of a four cornered picture and can be rotated about a vertical axis the projector can be placed not only on one side of the projected picture, which is thus not obstructed by the projector and it's operator, but alternatively to the either side thereof. The picture can be square or rectangular. The invention can be applied both with overhead projectors and with TV type projectors.

20 Claims, 4 Drawing Sheets

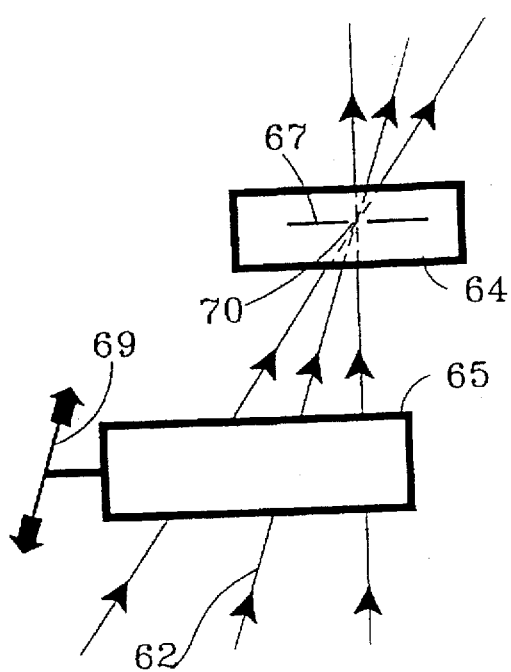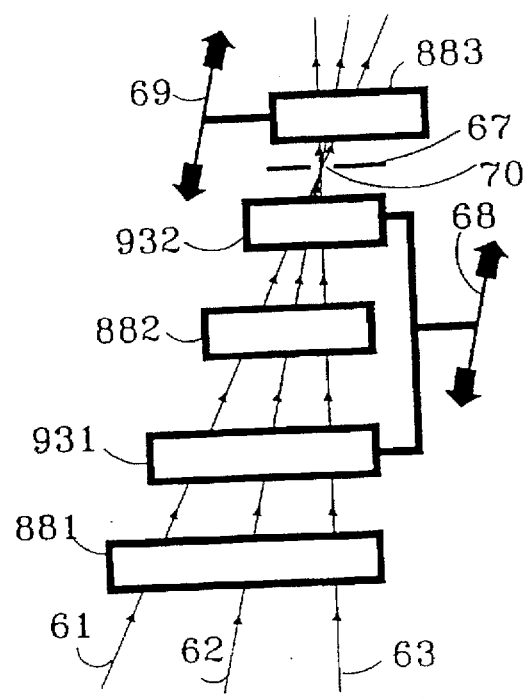
FIG. 7
FIG. 8

PROJECTOR

The present invention relates to a projector of the kind defined in the preamble of claim 1. The basic object of the invention is to enable a horizontal transparent image to be reproduced on a vertical screen, and to enable the image to be switched between a position in which it lies to the right or to the left of the projector to a position in which it lies to the left or to the right of said projector while, at the same time, lying either beneath or above the projection head with correct reproduction or imaging on a vertical screen.

According to a first embodiment of the invention, the four-cornered intended for positioning of the image, or picture, is square, meaning that an image can be arranged thereon in different ways, therewith enabling the object of the invention to be achieved by swinging the projection direction through an angle of 90 degrees. According to a second embodiment, the image is rectangular, which is necessary for instance when the image is a TV image. The projection direction must then be rotated through 180 degrees, in order to achieve the general object of the invention.

A known overhead projector (Swedish Patent 8701304-1, Publication No. 457,022) enables an image to be projected on a vertical screen without being twisted or distorted, both above and to one side of the projector. This projector has also the feature of being totally non-glare.

It is a significant disadvantage when an image can be projected only on one side of the projector. It may be desirable to be able to alternate between right-side and left-side projection with one and the same projector, in view of the disposition of the room and the viewers. Lateral projection has important ergonomical advantages, since the operator is able to stand in front of the projector without obstructing the projected light or blocking the picture or image. These drawbacks are apparent with present-day overhead projectors.

When using an overhead projector according to the first embodiment, with the projection head placed so that the orthogonal projection of the head onto the object plate lies in the vicinity of one corner of the object plate facing towards the projection screen, it is possible to alternate or switch between right-side and left-side projection, by rotating the projector through 90 degrees in the horizontal plane so that the projection head will still lie above one corner of the object plate nearest the screen, while at the same time swinging the projection direction through 90 degrees in an opposite direction. This enables the overhead projector to be placed on any side of the wall or projection screen observed by the viewers. When the projection head lies on the right as seen from the auditorium, the image or picture will lie to the right of the projector, whereas when the projection head lies to the left, the image or picture will lie on the left of the projector.

When considering the optical beam path, while ignoring reflection, it will be seen that the image and its reproduction are displaced or offset in relation to the main axis of the lens system, which places high demands on the wide angle properties. Swedish Patent Specification 8803253-7, Publication No. 468335, discloses one example of a usable lens system. According to one embodiment of the invention, the component lens elements have their optical axes parallel but laterally displaced. This reduces the number of lenses required and/or improves image resolution.

The invention can be applied both when the projected image or picture is comprised of a large diapositive, overhead projector, and for projecting electronically generated images by means of an LCD screen. Hitherto, the projection of such images has not been successful in practice, for different reasons. One particular problem in this regard resides in the low thermal resistivity. This problem can be minimized by allowing light that is incident from the illuminating apparatus and which shall not be projected through the objective to spread out in all directions instead of being absorbed. LCD screens that have this property are known to the art.

The invention will now be described with reference to schematic examples thereof.

FIGS. 7 and 8 illustrate schematically the lens positioning for an objective appropriate for use with the invention.

Figure 1:
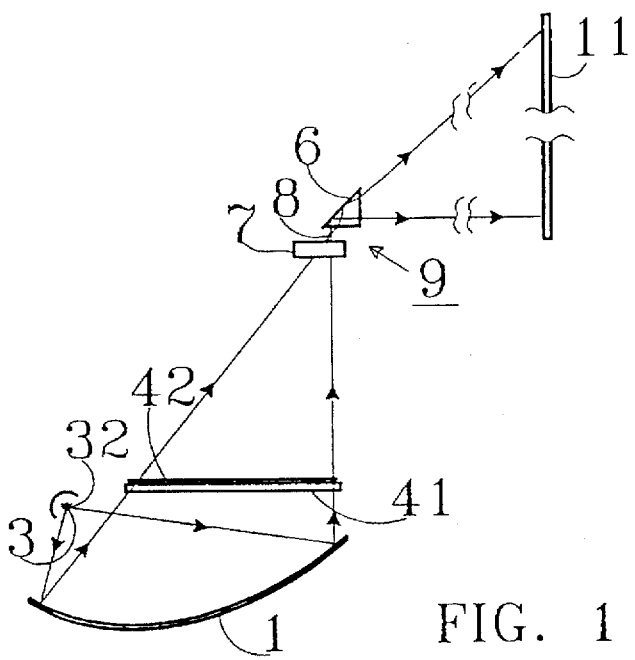
FIG. 1 is a schematic longitudinal section view orthogonal to the projection screen and taken through the projection head of an inventive projector.

FIG. 1 is a schematic longitudinal section view orthogonal to the projection screen 11 through the projection head 9 for an inventive projector. The light emanates from the light source 3, which may be a real light source or an image, real or virtual, of a light source. The light source 3 coincides with one focal point 32 of an ellipsoid 1, whose other focal point 8 lies in the projection head 9. Light from the light source 3 is reflected against the ellipsoid mirror 1 and passes the object plate 41 and the transparent object 42. The projection head 9 with the objective 7 and the light deflecting element 6 focus the image of the object 42 on the screen 11.

Figure 2:
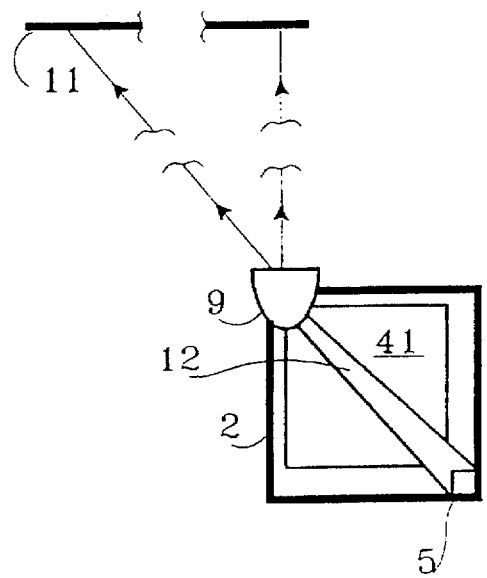
FIGS. 2 and 3 illustrate schematically the use of a projector according to a first embodiment of the invention for right-side and left-side projection respectively.
Figure 3:
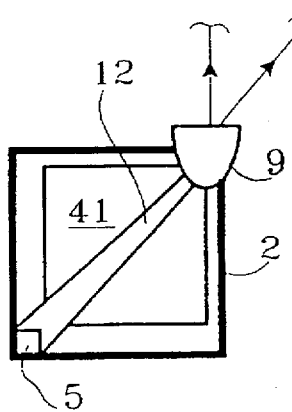

FIGS. 2 and 3 illustrate schematically the use of an inventive projector 2 for right-side and left-side projection respectively. The projector is shown for left-side projection in FIG. 2. Right-projection illustrated in FIG. 3 is achieved by rotating the projector 2 clockwise through 90 degrees while, at the same time, rotating the projection head 9, i.e. its reflective part, anti-clockwise through 90 degrees. The image is projected in both instances onto a vertical screen with the image above the projection head, without distortion. The projection head is attached to the opposite corner 5 of the projector 2, with the aid of an arm 12. This provides ergonomical advantages when switching between left-side and right-side projection. Alternatively, the arm 12 may be attached at the same corner of the projector on which the projection head is located. Naturally, a combination of these two methods of arranging the arm 12 is also feasible.

In order to obtain uniform distribution of light in the image, it may be necessary to use some form of diffusor, for instance in the form of cross-laid microprisms or a microlens variant of a honeycomb condenser placed close to an image of the light source.

Figure 4:
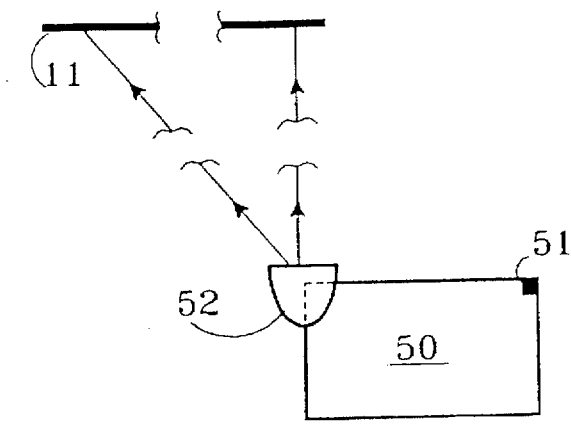
FIGS. 4, 5 and 6 illustrate schematically the use of a projector according to a second embodiment of the invention.
Figure 5:
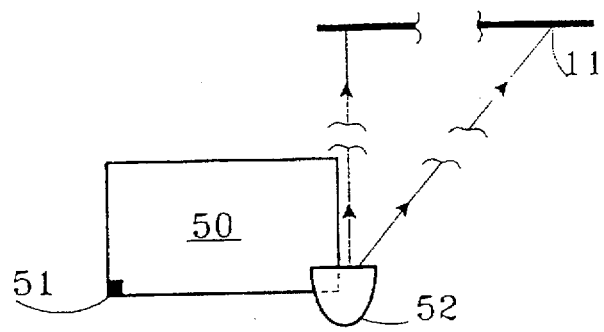

FIGS. 4 and 5 illustrate how a projector 50 having a rectangular image format can be used for both left-side and right-side projection. The projector, which for use for TV purposes and like purposes can be conceived to be hung from the ceiling and seen from beneath, is placed so that its image transmission element is parallel with the ceiling. In FIG. 4, the projector is positioned so that the projection head 52 is located nearest the screen and left-side projection is obtained. In FIG. 5, the projector and the projection head have been rotated through 180 degrees in the horizontal plane, whereas the projection head, i.e. its deflecting part 6 has been rotated through 180 in relation to the projector, and right-side projection is obtained. The right and left in the description can change places with one another when the projection head 52 is placed in position 51 instead.

Figure 6:
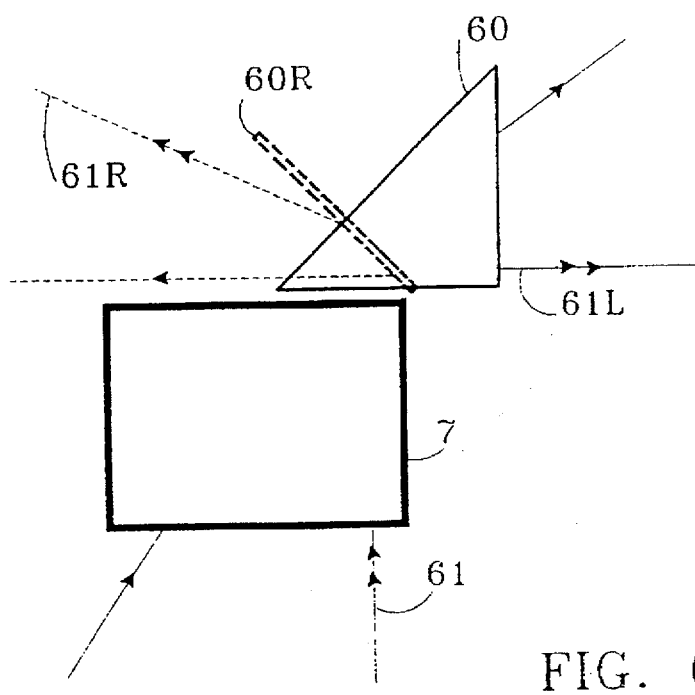

FIG. 6 illustrates how light is deflected in the projection head 775 in the projector shown in FIGS. 4 and 5. In the case of the projector shown in FIG. 4, a three-edge prism 60 is used to achieve desired deflection of the light onto the screen, whereas the mirror 60R is used in the projector in FIG. 5. In the three edge prism, total reflection is utilized advantageously for the deflecting. When switching between the configurations illustrated in FIGS. 4 and 5, it is necessary to turn the image electronically upside down. This problem can also be solved optically, by using an Amici prism instead of the mirror 60R. The mirror 60R may be advantageously replaced with a mirror-coated three-edge prism, which can be identical to a prism 60 that has been rotated through 180 degrees.

As will be seen from FIG. 1, the projection objective 7 is advantageously decentered dx, dy in relation to the common second focal point 6, so that the light beam will pass through a central region of the projection objective 7. Such decentering affords a minimization of imaging errors and also a minimization of the size of the objective 7. In accordance with one preferred embodiment of the invention, illustrated in FIG. 7, the projection objective 7 constructed for decentered positioning may be considered to include a fixed lens group 64 and a movable lens group 65 which can be displaced for focusing purposes. Distinct from a uniformly decentered projection objective, two of the lens groups of the objective are mutually decentered, wherein each is essentially centered to the passing light beam and wherein both are, of course, adapted in size to the size of the centrally passing light beam. A field mixer for the illumination object 67 is placed at the position 70 at which reproduction of the light source is obtained, so as to eliminate stray light and therewith enhance picture or image contrast.

In accordance with one preferred embodiment, movement 69 of the movable lens group is orientated generally limited by the mean direction 62 of the light beam that passes the projection objective and the edge-direction 63, which is optically orthogonal to the imagine transmission element 1.

FIG. 8 shows an example which includes an optically compensated zoom objective according to analog principles, wherein the objective includes in addition to three axially separated lens groups 881, 882, 883 two zoom lens groups 931,932 which are mutually connected and are displaceable for zooming purposes in a direction which is delimited by the mean direction 62 and the edge direction 63. The lens group 883 or 881 may also be displaceable in the direction 69 for focusing purposes, this direction preferably being identical with the direction 68. The zoom objective having solely one movement is shown merely to illustrate the principle. It is possible to construct analogously mechanically compensated zooms which have a plurality of zooming movements, all of which have the direction 68. In the simplest case, all components in FIGS. 12 and 13 are decentered equally and the movements 68, 69 are parallel with the optical axis of the objective.

The projection objective described with reference to FIGS. 7 and 8 has the significant advantage of enabling solely one-half of a lens to be used, and hence the objective can be divided into two halves for use in different or the same objectives, therewith reducing costs. This possibility is not found in conventional optics, since more than half the lens is always used with all lenses in the objective. In certain cases, one and the same lens can be divided into more than two equal parts.

In FIGS. 7 and 8, the lens systems have been shown without mirror surfaces, whereas in FIG. 1 a mirror surface is inserted between different parts of the objective. The person skilled in this art will understand that the position of this direction changing component is a matter of suitability which is decided by other construction factors. In the case of the examples having decentered lens combinations according to FIGS. 7 and 8, the reflecting elements will preferably be placed in the beam path downstream of the last lens in respective systems.

Figure 9:
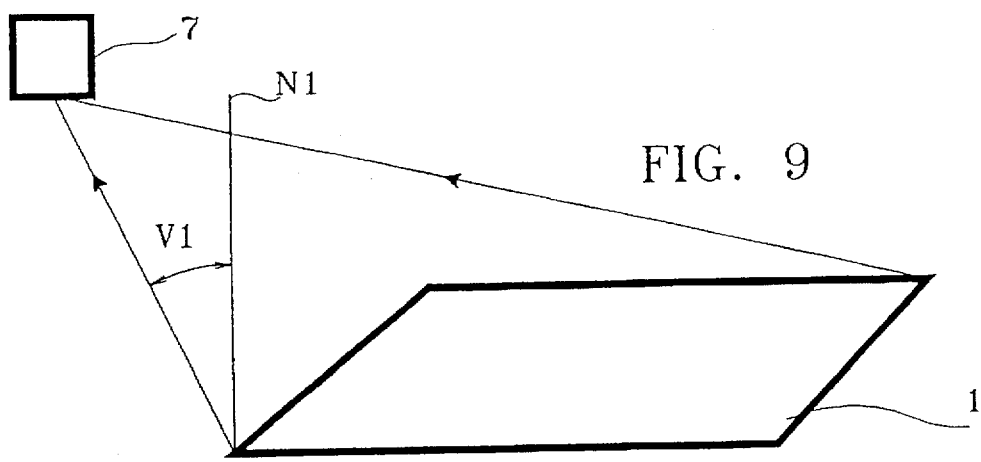
FIGS. 9 to 11 illustrate the principle of inclined or oblique projection in the code when the projection head projected orthogonally to the plane of the screen will lie outside the projection screen.

FIG. 9 is a highly schematic illustration of one aspect of the invention, in which the projection objective (1) is projected orthogonally to the plane of the image transmission element (1) and lies outside the optically active surface (1) of the image transmission element, so that the main beam which passes from the corner nearest to the objective to said objective defines an outwardly turned angle V1 in relation to a normal (N1) to the image transmission element (1), wherein the angle may be in the order of 0 to 20 degrees.

Figure 10:
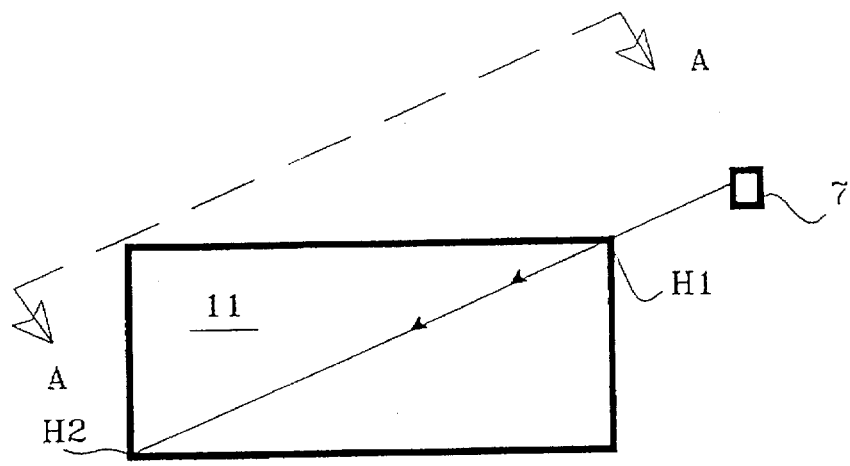

FIG. 10 illustrates schematically how a projector according to FIG. 9 will be placed in relation to the screen (11). The projection objective 7 will lie essentially on the extension of a diagonal of the corners H1 and H2 of the projected image.

Figure 11:
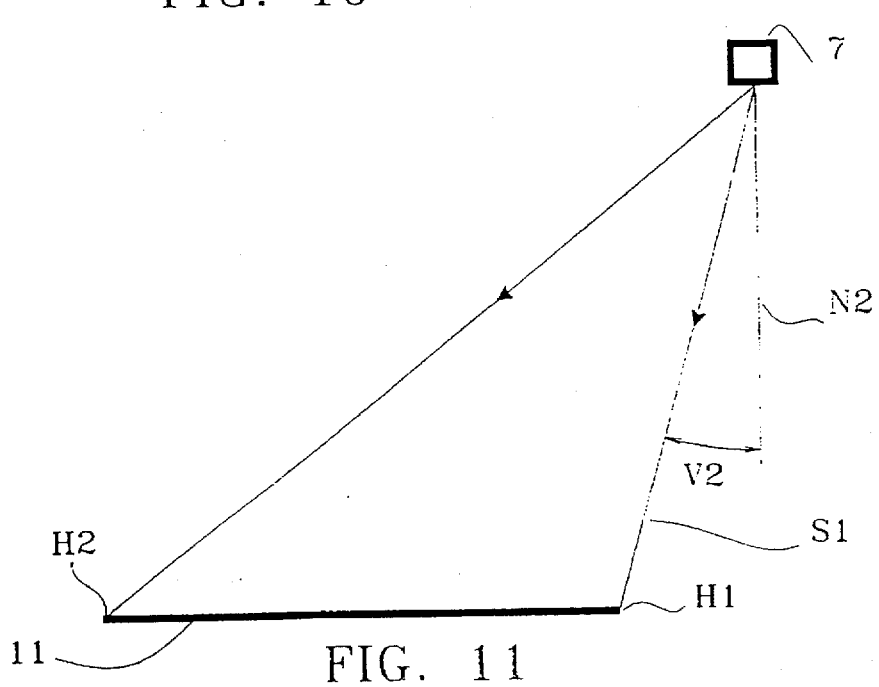

FIG. 11 illustrates schematically a view A—A orthogonal to the diagonal H1–H2 in the image (11) on the arrangement in FIG. 10, wherein the beam (S1) passing from the projection objective (7) to the nearest corner (H1) of the projected image (11) defines an angle V2 which lies in the range of 0 to 20 degrees.

Although when referring to the described arrangements, it has been assumed that the described displacement of the projected image is both vertical and horizontal, it will be understood that the arrangements may also be constructed to obtain more or less central, conventional projection.

I claim:

1. A projector for imaging or reproducing a transparent, flat and four-cornered image in a first plane on a screen or a wall in a second plane which is generally at right angles to the first plane, said projector including a light source, an illuminating apparatus for illuminating the image from one side thereof, and a projection optic which includes a reflecting surface, wherein the projection optic is displaced laterally in relation to a centerpoint normal of the image, the projection optic being arranged essentially on a normal to the image drawn through a corner of said image; and in that a light deflecting part in said projection optic can be swung around a pivot axis which coincides generally with said normal; and the illuminating apparatus being constructed to deliver a convergent light beam which is directed towards and covers the image and the light rays of which are intended to combine essentially within the projection head.

2. A projector according to claim 1, wherein the image has a square shape and said projector can be swung through at least 90 degrees, to project an image onto a vertical screen or a wall wherein the image can be projected with said image positioned horizontally alternatively in two different directions.

3. A projector according to claim 1, wherein the image has a rectangular shape and said projector can be swung through at least 180 degrees, wherein the image can be projected with said image positioned horizontally on a vertical wall or screen, and alternatively in two different directions.

4. A projector according to claim 1, 2 or 3 wherein the illuminating apparatus includes an ellipsoidal mirror whose one focal point is projected onto a point within the projection head and the other focal point of which is a real or virtual, essentially punctiform light source which illuminates the ellipsoidal mirror.

5. A projector according to claim 1, 2 or 3 wherein the image is comprised of an LCD plate having pixel surfaces which can each be set electrically to an optically transparent state and to an optically blocked state or to levels of light transparency lying therebetween.

6. A projector according to claim 1, 2 or 3 wherein the projection optic is comprised of a plurality of laterally displaced lens elements whose center points are mounted in connection with a line which is directed generally to the center point of the original surface.

7. A projector according to claim 6 wherein at least one of the laterally displaced lens elements is displaceable in a direction which coincides essentially with said line for achieving focusing ability or an enlargement change.

8. A projector according to claim 6 wherein at least two of the laterally displaced lens elements can be displaced in a direction which coincides essentially with said line individually in relation to other optical elements included in the projection optic, for achieving both focusing ability and an enlargement change.

9. A projector according to claim 1, 2 or 3 wherein the whole of the projection optic is generally displaced laterally in relation to a normal from the center point of the entrance pupil of the projection objection to the plane in which the four-cornered image lies.

10. A projector according to claim 6 wherein half or smaller parts of lenses are used as a number of lens elements in the projection objective.

11. A projector according to claim 1 wherein the projection head is attached to an arm 10 which is attached to that corner of the projector which is diametrically opposite the corner above which the projection head is positioned.

12. A projector according to claim 1 wherein the projection head is attached to an arm which is attached adjacent the corner of the projector above which the projection head is positioned.

13. A projection arrangement according to claim 1 wherein a focal region in said projection optic of the illumination optic common to all light sources is located so that the optical orthogonal projection thereof to said four-cornered image will lie outside a corner of the four-cornered image such that the beam that passes from the objective to the nearest corner of the projection screen will define an angle of between 0 and 20 degrees with a normal to the screen.

14. A projection lens for oblique projection comprising a projection optic, said projection optic comprising a plurality of laterally displaced lens elements which are essentially centered to a passing light beam representing a four-cornered image, the center points of respective said lens elements being generally mounted on a line which is substantially directed to the center point of an image transmission element for generating said four-cornered image.

15. A projector according to claim 14 wherein at least one of the laterally displaced lens elements is displaceable in a direction which coincides essentially with the line for achieving focusing ability or an enlargement change.

16. A projector according to claim 14 wherein at least two of the laterally displaced lens elements can be individually displaced in relation to other optical elements included in the projection optic in a direction which coincides essentially with the line for achieving both focusing ability and an enlargement change.

17. A projector according to claim 14, 15 or 16 wherein half or smaller parts of lenses are used as a number of lens elements in the projection objective.

18. A projector according to claim 14, 15 or 16 wherein the projection head is attached to an arm 10 which is attached to that corner of the projector which is diametrically opposite the corner above which the projection head is positioned.

19. A projector according to claim 14, 15 or 16 wherein the projection head is attached to an arm which is attached adjacent the corner of the projector above which the projection head is positioned.

20. A projection arrangement according to claim 14, 15 or 16 wherein a focal region of the illumination optic common to all light sources is located so that the optical orthogonal projection thereof is said four-cornered image and will lie outside a corner of the four-cornered image such that the beam that passes from the objective to the nearest corner of the projection screen will define an angle of between 0 and 20 degrees with a normal to the screen.

* * * * *

UNITED STATES PATENT AND TRADEMARK OFFICE
CERTIFICATE OF CORRECTION

PATENT NO. : 5,730,517
DATED : March 24, 1998
INVENTOR(S) : Berglund

It is certified that error appears in the above-identified patent and that said Letters Patent is hereby corrected as shown below:

Title page, item [57],
In the Abstract, line 2, "horizintal" should read
--horizontal--

Column 3, line 9, delete "775"

Column 3, line 61, after "direction 68." begin new paragraph

Signed and Sealed this

Twenty-eighth Day of July, 1998

Attest:

Attesting Officer

BRUCE LEHMAN

Commissioner of Patents and Trademarks